Figure 1B:
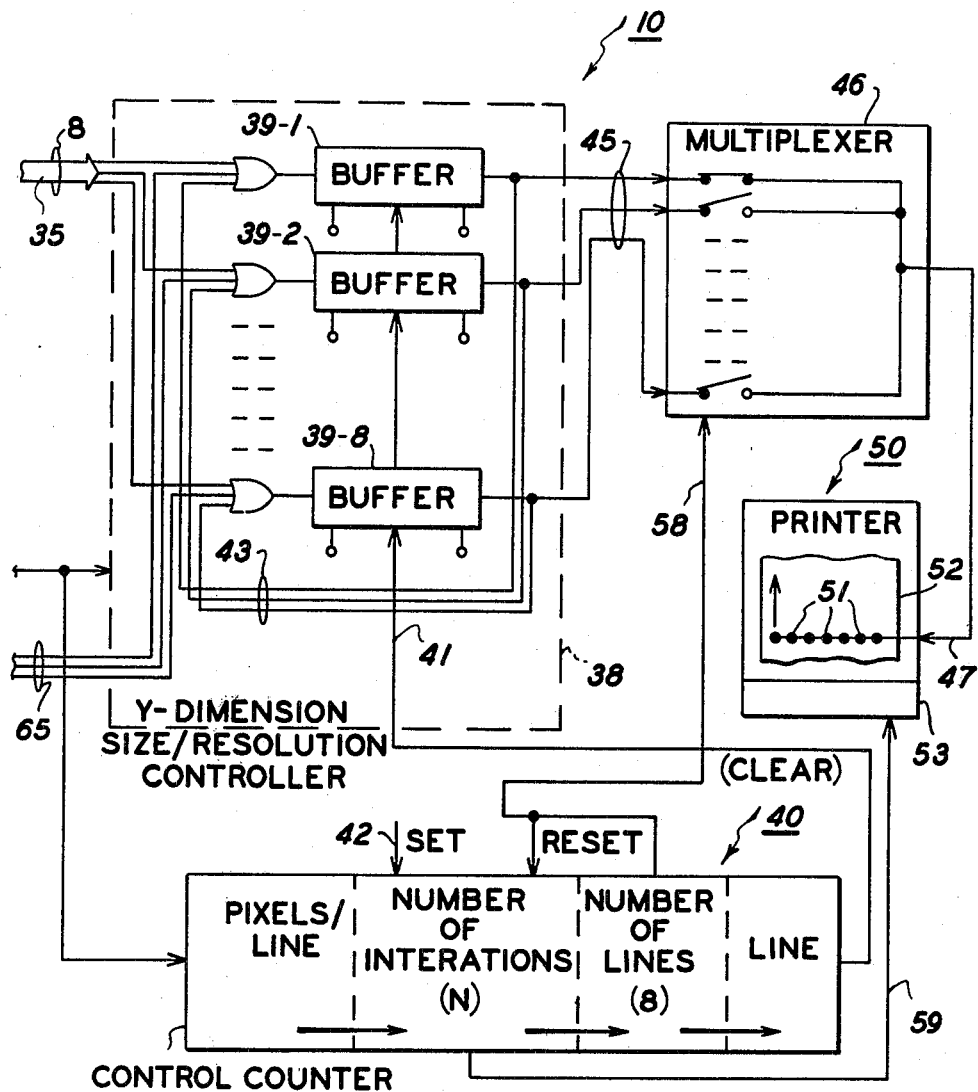
Figure 1:
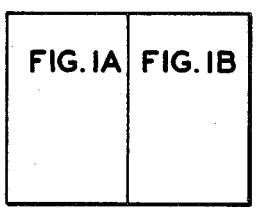

United States Patent [19]

Wiener

[11] 4,367,533
[45] Jan. 4, 1983

[54] IMAGE BIT STRUCTURING APPARATUS AND METHOD

[75] Inventor: Patricia P. Wiener, La Honda, Calif.

[73] Assignee: Xerox Corporation, Stamford, Conn.

[21] Appl. No.: 181,332

[22] Filed: Aug. 25, 1980

[51] Int. Cl.³ .......................... G06F 3/14; G06K 15/02
[52] U.S. Cl. ..................................... 364/519; 340/731; 178/30
[58] Field of Search ................. 364/515, 521; 340/731; 178/30

[56] References Cited

U.S. PATENT DOCUMENTS

| | | | |
|---|---|---|---|
| 3,444,319 | 5/1969 | Artzt et al. | 178/30 |
| 3,659,283 | 4/1972 | Ophir | 340/731 |
| 3,665,453 | 5/1972 | Nielsen | 340/794 |
| 3,991,868 | 11/1976 | Robinson et al. | 340/731 |
| 4,068,224 | 1/1978 | Bechtle et al. | 178/30 X |
| 4,090,188 | 5/1978 | Suga | 340/731 X |
| 4,107,662 | 8/1978 | Endo et al. | 340/731 |
| 4,129,860 | 12/1978 | Yonezawa et al. | 340/731 |
| 4,314,244 | 2/1982 | Demke et al. | 340/731 |

FOREIGN PATENT DOCUMENTS 2915075 10/1979 Fed. Rep. of Germany ...... 340/731

Primary Examiner—Felix D. Gruber
Attorney, Agent, or Firm—Frederick E. McMullen

[57] ABSTRACT

A bit structuring apparatus having a font memory for storing alpha-numeric characters and/or tonal definitions in a window representing a pixel space. The alpha-numeric characters thus stored can include both the character and required character spacing. The font memory is addressable by coded address data to output a stream of pixels representative of the characters selected. The apparatus includes a programmable divide-by-N counter selectively operable to reduce the frequency of the pixel stream and expand the characters along the X-axis, line buffers for buffering the pixels pending discharge to a remote output, a return bus for re-circulating pixels in the line buffers, a multiplexer for selectively coupling individual line buffer outputs to the remote output and a programmable counter for controlling the number of times each line buffer discharges pixels to the remote output, each additional discharge expanding the characters along the Y-axis. Additionally, data from other sources, i.e. computer, CRT, facsimile, scanner, memory, etc., representing a fixed definition may be received independently, both for storage and manipulation. The apparatus can, by programming or switching, alter size and effectively expand or reduce the data on a line by line basis in the same manner as alpha-numeric data from the font memory.

4 Claims, 7 Drawing Figures

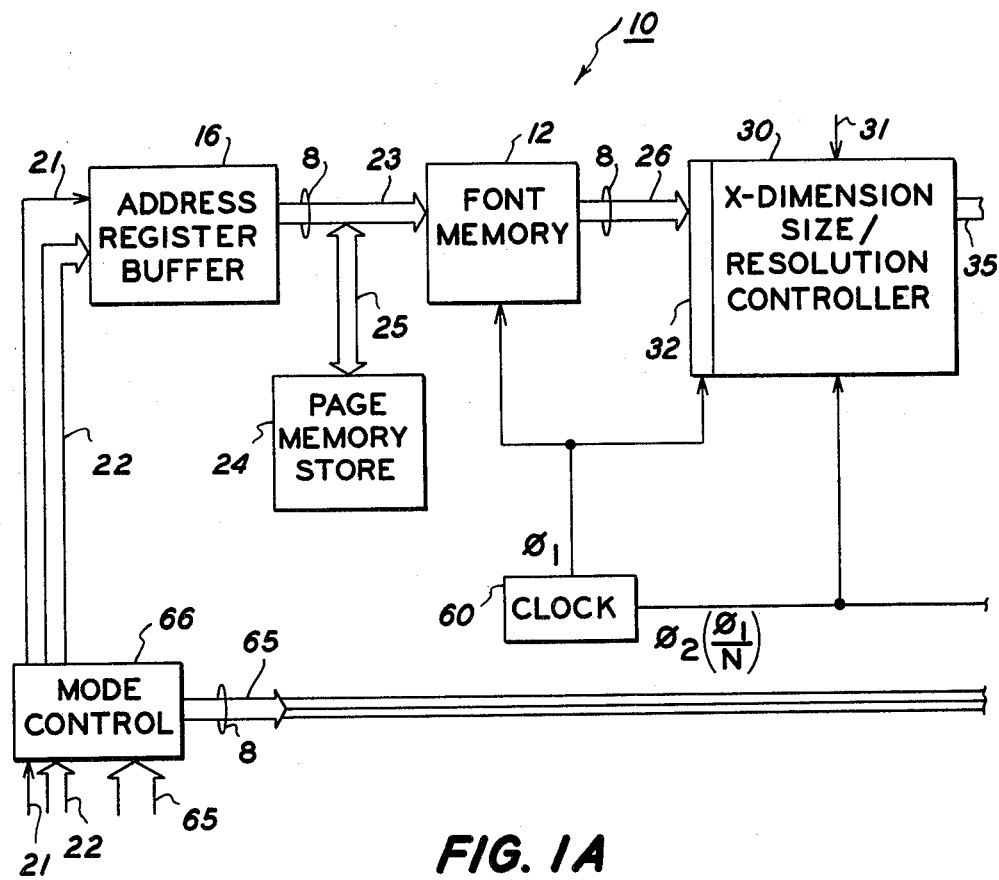
FIG. 1A
FIG. 3
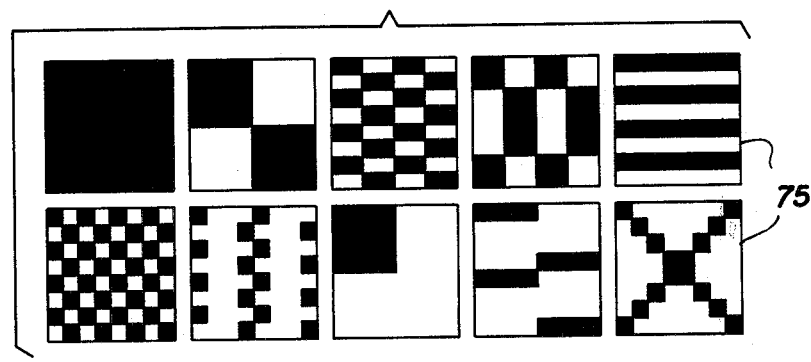

IMAGE BIT STRUCTURING APPARATUS AND METHOD

The invention relates to a bit structuring apparatus and method, and more particularly to an improved apparatus and method for controllably structuring character image bit patterns.

The need for a low cost albeit high quality system for taking orthographic information, typically alpha-numeric characters of various font styles and types, and bit structuring that information to provide desired character size and resolution has long been felt in the copying and printing arts. Attempts at bit structuring have, however, left holes in the characters produced, required inordinately large amounts in memory to store line and font data, destroyed proportional spacing, and required a substantial amount of computation and arithmetic manipulations.

This invention relates to an apparatus for controllably structuring the image bit patterns representing alpha-numeric characters to permit the size of the characters to be varied selectively, comprising the combination of: a font memory for storing imaging bit patterns representative of discrete alpha-numeric characters; address means for addressing selected ones of the characters in the front memory so that the font memory outputs a stream of character bits; bit expanding means for expanding the stream of character bits along a first axis to magnify the characters addressed in one dimension, and line iterating means for iterating the stream of character bits along a second axis perpendicular to the first axis to magnify the characters addressed along a second dimension perpendicular to the first dimension.

The invention further relates to a method of generating variable sized alpha-numeric characters having the steps of: storing pixel representations of the alpha-numeric characters in memory; addressing selected ones of the characters in the memory; outputting the addressed character pixels at a preset frequency; selectively reducing the pixel frequency to expand the characters along a first axis; and iterating the pixels a selected number of times to expand the characters along a second axis perpendicular to the first axis.

Figure 2A:
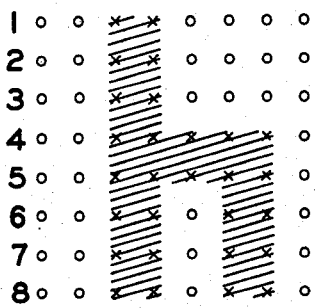
Figure 2B:
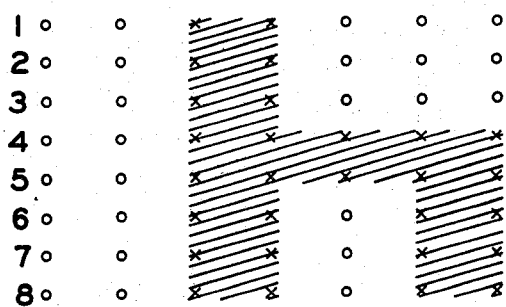
Figure 2C:
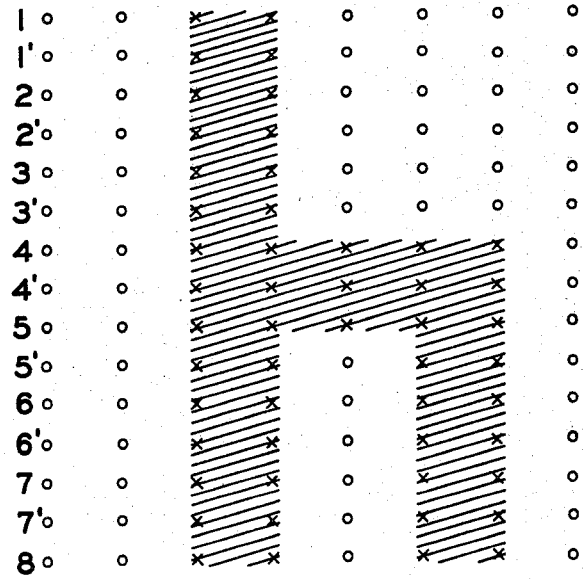

Other objects and advantages of the invention will be apparent from the ensuing description and drawings in which:

FIGS. 1A and 1B together are a schematic diagram of the bit structuring apparatus of the present invention;

FIGS. 2A, 2B, and 2C illustrate the effect of the bit structuring technique of the present invention on an exemplary alpha-numeric character; and FIG. 3 is a view illustrating various picture patterns having different tonal relationships.

As will appear herein, there is described a low cost, high quality system for taking orthographic information, typically alpha-numeric characters of various font styles and design, and bit structuring the information. A window is created permitting the aspect ratio of any one character in the X, Y plane to be related to desired character spacing and to serve as the source definition of the X, Y space per character or pattern. By setting up an iterating space oriented register (Y-DIMENSION SIZE/RESOLUTION CONTROLLER 38 herein) and using a separate space expansion control (X-DIMENSION SIZE/RESOLUTION CONTROLLER 30 herein), redefining and generating of a space bit structure related to resolution and size is achieved. As a result, problems attending resolution increases and/or character size increases which often result in holes in characters and loss of proportional spacing, or which require increased amounts of relatively expensive storage for line data, fonts, etc., or which require complex computations and arithmetic manipulations, are obviated or reduced.

And separately, there is also achieved the ability to handle and store non-coded data, as for example facsimile transmitted data.

In the herein described system, bit data is written one line at a time. Character size in the Y-direction is related to the number of times a line of data is iterated while character size in the X-direction is related to the spacing of bits. Iteration does not, however, imply additional bit storage requirements greater than the character font memory.

In the X-direction, a divide-by-N circuit (X-DIMENSION SIZE/RESOLUTON CONTROLLER 30) takes the data stream generated by the FONT MEMORY (12 herein) and reduces the data operating frequency by a factor N. This introduces a relationship referenced to character size and defined resolution in the X-direction. The same factor N can control the sequencing of a space generator shift register (Y-DIMENSION SIZE/RESOLUTION CONTROLLER 38) which acts to produce the individual line N number of times by allowing the recirculating shift register to output the line N times. This controls character height in the Y-dimension. The aspect ratio of the characters, however remains the same despite the changes in character size.

Referring to the drawings there is shown the bit structuring apparatus 10 of the present invention. Bit structuring apparatus 10 includes a FONT MEMORY 12 which may comprise any suitable RAM or ROM type memory chip for storing alpha-numeric characters in one or more fonts. For purposes of description herein, each character is defined in an 8-bit×8-bit (i.e. 8×8) pattern, the aforesaid pattern including spacing between characters. Other bit patterns (i.e. 4×4, 16×16, etc.) may instead be contemplated. While various fonts may be envisioned, a single font and character h (shown in FIG. 2) is employed herein for explanation purposes.

An ADDRESS-REGISTER BUFFER 16 is provided for addressing memory 12, BUFFER 16 receiving and temporarily buffering coded address data input thereto from a suitable address source (not shown) through serial data line 21 or parallel data bus 22. The coded address data, which may for example, comprise ASCII coded data, may originate from any suitable source for example, a computer, an operator console, etc.. The address data from ADDRESS-REGISTER BUFFER 16 is input to FONT MEMORY 12 through address bus 23.

Where the coded address data input to ADDRESS-REGISTER BUFFER 16 is in serial form, the data is converted to parallel coded address data by REGISTER-BUFFER 16.

The character data is output by FONT MEMORY 12 in the form of binary level image pixels or bits to data bus 26 and X-DIMENSION SIZE/RESOLUTION CONTROLLER 30. The character pixels are clocked out of MEMORY 12 at a predetermined clock rate by clock signals $\phi_1$ derived from pixel clock 60. CONTROLLER 30, which is preferably comprised of plural divide-by-N circuits, serves to selectively enlarge or magnify the character data output by FONT MEMORY 12 along one axis (i.e. the X axis) by reducing the operating frequency of the pixel stream. This has the effect of spacing the character pixels further apart. At the same time extra or duplicate character pixels are interpolated in the space created to maintain character image resolution. Lead 31 permits control data from a suitable source such as an operator's console (not shown) to be input to CONTROLLER 30 to regulate the size and the resolution of the output character along the X axis. CONTROLLER 30 includes an input data buffer section 32 for temporarily storing the character pixels input from FONT MEMORY 12 while the pixels are being processed.

A PAGE MEMORY STORE 24 is provided for storing the coded address data, STORE 24 being coupled to address bus 23 through page storing bus 2. PAGE MEMORY STORE 24 permits additional copies of the page to be printed out while avoiding the need to maintain the address source on line.

In the exemplary arrangement described heretofore, each character including spaces between characters is defined in terms of an 8×8 bit structure. X-DIMENSION SIZE/RESOLUTION CONTROLLER 30, where magnification of the character along the X axis is selected, alters the bit structure by a factor N, the factor N representing the magnification selected. As a result, the bit structure of the character pixels output by CONTROLLER 30 to bus 35 and Y-DIMENSION SIZE/RESOLUTION CONTROLLER 38 is in the form of 8N×3 bits. It will be understood that where the character is not magnified, N would be equal to 1.

Character pixels output by X-DIMENSION SIZE/RESOLUTION CONTROLLER 30 pass through bus 35 to Y-DIMENSION SIZE/RESOLUTION CONTROLLER 38. There, the character pixels may be iterated on a line by line basis to expand the characters along an axis (i.e. the Y axis) perpendicular to the axis of expansion by X-DIMENSION SIZE/RESOLUTION CONTROLLER 30. Y-DIMENSION SIZE/RESOLUTION CONTROLLER 38 includes a plurality of line buffers 39-1, 39-2, 39-8 for temporarily storing each line of character pixels pending output thereof to bus 45. In the example described Y-DIMENSION SIZE/RESOLUTION CONTROLLER 38 has 8 line buffers, one for each line of character pixels that comprise the 8×8 character pattern. It will be understood that the number of line buffers may change with different character patterns.

The number of times each line of character pixels is iterated is controlled by a CONTROL COUNTER 40 through lead 41. COUNTER 40 serves to count the number of character pixels that comprise a line, the number of iterations per line (i.e. N), the number of lines per character (i.e. 8 in the 8×8 pattern discussed), and completion of the last line. The number of iterations per line (i.e. N) is programmed via line 42 (SET) in accordance with the character magnification desired from a suitable controller such as a control console, computer, etc. Return bus 43 recirculates character pixels output by line buffers 39-1, 39-2, . . . 39-N to the line buffer inputs to permit line duplication where iteration is desired.

Character pixels are output by Y-DIMENSION SIZE/RESOLUTION CONTROLLER 38 to bus 45 and LINE SELECT MULTIPLEXER 46. MULTIPLEXER 46 serves to couple the individual lines of character pixels to output line 47 and an output device such as a styli type PRINTER 50, PRINTER 50 includes a plurality of printing styli 51 arranged in a row. When actuated following loading thereof, styli 51 print a line of character pixels on a copy material such as paper web 52. A suitable web advancing mechanism (not shown) is provided to advance web 52 in the direction shown by the solid line arrow, one line at a time. PRINTER CONTROL 53 controls operation of PRINTER 50.

While the output device is illustrated herein as a stylii-type PRINTER, other printer types may be envisioned. Further, other forms of output devices, such as copiers, CRTs, facsimile units, etc. may be contemplated.

Switching control of MULTIPLEXER 46 is exercised by COUNTER 40 through lead 58. A control line 59 from COUNTER 40 is provided to the output device, i.e. PRINTER 50 to synchronize operation of the output device with the bit structuring apparatus 10.

A suitable clock 60 provides pixel clock signals $\phi_1$, $\phi_2$ for clocking out character pixels from FONT MEMORY 12 through X and Y-DIMENSION SIZE/RESOLUTION CONTROLLERS 30, 38 respectively to PRINTER 50. Pixel clock signals $\phi_2$ are also input to CONTROL COUNTER 40 to synchronize operation of COUNTER 40 with the movement of character pixels through the bit structuring apparatus 10.

Referring now particularly to FIG. 2, a stepwise progression of the exemplary font character h is thereshown through the bit structuring apparatus 10. Character h is obtained by addressing FONT MEMORY 12 with the appropriate addressing code. The output of FONT MEMORY 12 to bus 26 comprises a binary level character pixel representation of the character h as seen in FIG. 2A.

Presuming that it is desired to double the character size, control signals from the system controller such as a control console (not shown) to control leads 31, 42 program X-DIMENSION SIZE/RESOLUTION CONTROLLER 30 and CONTROL COUNTER 40 respectively. As a result, the frequency of the character pixels output by X-DIMENSION SIZE/RESOLUTION CONTROLLER 30 is reduced by half, i.e. character pixels are discharged from CONTROLLER 30 at a rate ½ the rate at which character pixels are input to CONTROLLER 30 by FONT MEMORY 12. As a result, the size of the character h along the X axis is doubled, as seen in FIG. 2B. Buffer section 32 of CONTROLLER 30 serves to buffer the character pixels input by FONT MEMORY 12 until the pixels are processed in accommodation of the difference between pixel input rate and pixel output rate to and from CONTROLLER 30.

The character pixels representing the partially expanded character are input to Y-DIMENSION SIZE/RESOLUTION CONTROLLER 38, each line of character pixels being loaded into the line buffer 39-1, 39-2, . . . 39-8 therefor. MULTIPLEXER 46 is pre-set to output the first line of character pixels in the first line buffer 39-1 to output lead 47 and PRINTER 50.

As the line of character pixels are clocked from line buffer 39-1 through MULTIPLEXER 46 and lead 47 to PRINTER 50, the character pixels are recirculated back to the buffer input through return bus 43. At a predetermined pixel count, representative of the total number of pixels that comprise the line, CONTROL COUNTER 40 decrements by 1. The aforedescribed process is repeated with the recirculated character pixels from the first line buffer 39-1 again output via MULTIPLEXER 46 and output lead 47 to PRINTER 50.

Following completion of the line, the control signal in lead 58 from COUNTER 40 causes MULTIPLEXER 46 to couple the second line buffer 39-2 to output lead 47. At the same time, the iteration count in COUNTER 40 is reset to 2, and the aforedescribed process repeated for the next two lines of character pixels.

The above process is repeated for the remaining lines that comprise the character to provide the expanded character shown in FIG. 2C having the same aspect ratio as the original character shown in FIG. 2A. When the last line buffer (i.e. 39-8) is emptied, CONTROL COUNTER 40 generates a signal (CLEAR) in lead 41 which clears line buffers 39-1, 39-2 . . . 39-8 of Y-DIMENSION SIZE/RESOLUTION CONTROLLER 38 in preparation for the next character line. On reaching the last line count, MULTIPLEXER 46 resets back to one to couple the first line buffer 39-1 of CONTROLLER 38 to output lead 47 and PRINTER 50.

To permit non-coded image pixels to be input to the bit structuring apparatus 10, a non-coded data input bus 65 is coupled to line buffers 39-1, 39-2 . . . 39-8 of Y-DIMENSION SIZE/RESOLUTION CONTROLLER 38. MODE CONTROL 66 permits selection of coded address data from serial data line 21 or parallel data bus 22, or non-coded image pixels via data input bus 65.

In addition to storing alpha-numeric characters of various fonts, FONT MEMORY 12 may also store various character tonal patterns such as the patterns 75 shown in FIG. 3 of the drawings. Where it is desired to generate patterns, the appropriate pattern 75 is addressed by a suitable coded address data. The selected pattern is output by FONT MEMORY 12 to X and Y DIMENSION SIZE/RESOLUTION CONTROLLERS 30, 38 where the pattern is selectively expanded in the X and/or Y direction prior to being output to the output device, i.e. PRINTER 50.

Additionally, by simultaneously addressing FONT MEMORY 12 and inputting non-coded text data via data input bus 54, pattern and text merger may be effected.

From the above, there is provided a relatively simple line and page formatting means allowing information and data pages to be presented to the same print head or other user. The information may comprise both coded and non-coded data from various sources such as CRT, facsimile transmission line, computer bit maps, scanning devices, keyboard, etc. Additionally, size variation is accomplished without the need to store characters of specific sizes thereby reducing memory requirements, character size control at the terminal is permitted, pixel continuity is regulated eliminating gaps in facetting and video viewing, pixel spacing is provided through memory without the need for program intervention, and selective call up of tonal definitions and text and imaginal data merging are permitted.

While the invention has been described with reference to the structure disclosed, it is not confined to the details set forth, but is intended to cover such modifications or changes as may come within the scope of the following claims:

What is claimed is:

1. Apparatus for controllably structuring the image bit patterns representing alpha-numeric characters to permit the size of the characters to be varied selectively, the combination comprising:
    (a) a font memory for storing imaging bit patterns representative of discrete alpha-numeric characters;
    (b) address means for addressing selected ones of said characters in said font memory whereby said font memory outputs a stream of character bits;
    (c) bit expanding means for expanding said stream of character bits output by said font memory along a first axis to magnify the characters addressed in one dimension;
    (d) line iterating means for iterating said stream of character bits output by said font memory along a second axis perpendicular to said first axis to magnify the characters addressed along a second dimension perpendicular to said first dimension, said line iterating means including plural line buffers for buffering said stream of character bits pending discharge to a remote output;
    (e) bit recirculating means tapped into the output of said line buffers for recirculating bits output by said line buffers to the input of said buffers as said stream of bits are being output by said line buffers to said remote output; and
    (f) programmable counter means for controlling the number of times said stream of character bits is repeatedly discharged by said line buffers to said remote output, said bit recirculating means recirculating said bits back to the input of said buffers each time said stream of bits is discharged by said line buffers whereby to expand said stream of character bits along said second axis.

2. The apparatus according to claim 1 including:
a source of character address signals;
a source of uncoded imaging bits; and
mode control means for selectively coupling said character address signal source to said address means to produce selected characters for processing by said bit expanding means and said line iterating means or coupling said imaging bits directly to the input of said line iterating means buffers.

3. The apparatus according to claim 1 including:
multiplexer means for selectively actuating individual ones of said line buffers to discharge bits therefrom to said remote output, said counter stepping said multiplexer means from one line buffer to the next.

4. An apparatus for controllably structuring the image bit patterns representing alpha-numeric characters to permit the size of the characters to be varied selectively, the combination of:
    (a) a font memory for storing image bit patterns representing discrete alpha-numeric characters of at least one font type;
    (b) address means for addressing selected ones of said characters in said font memory;
    (c) means for clocking out image bits representing characters addressed from said font memory at a predetermined bit frequency; and
    (d) control means for selectively restructuring the image bit patterns output by said font memory to vary the size of the characters represented by said image bit patterns,
    said control means including first bit expanding means for expanding said image bit patterns along the X-axis whereby to increase the width of the characters represented by said bit patterns; and second bit expanding means for expanding said image bit patterns along the Y-axis whereby to increase the height of the characters represented by said bit patterns, said second bit expanding means includes buffer means coupled to the output of said font memory for buffering said image bits output by said font memory, and a return loop coupled between the output and input of said buffer means to permit reintroduction of said image bits from the output of said buffer means to the input of said buffer means on output of said image bits from said buffer means whereby to permit said image bits to be duplicated and increase the height of the character represented thereby.

* * * * *